Jan. 10, 1939.  E. E. McCORMACK  2,143,204
FLOAT OPERATED VALVE MECHANISM
Filed Nov. 23, 1935
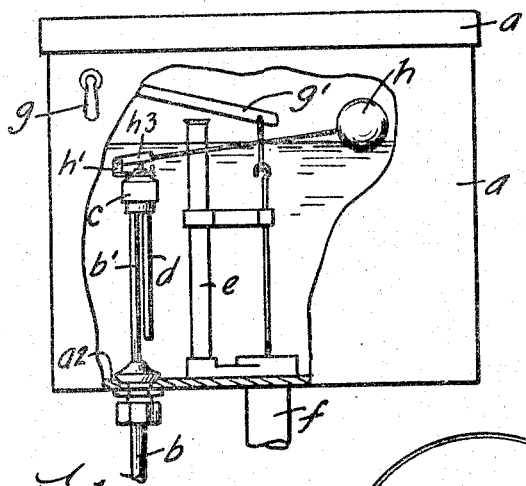
Fig. 1.
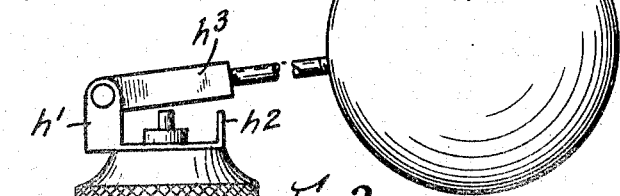
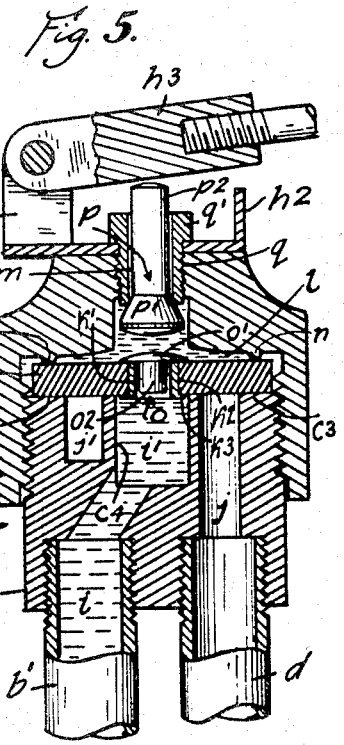
Fig. 5.
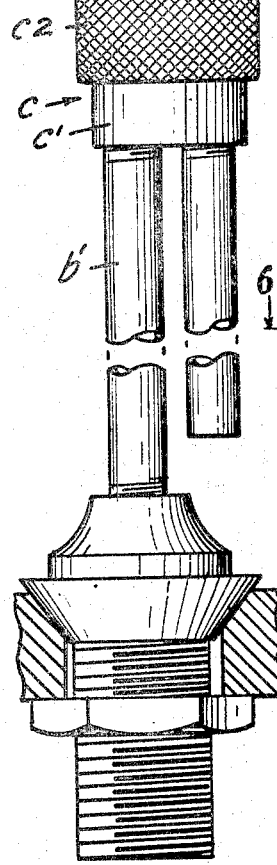
Fig. 2.
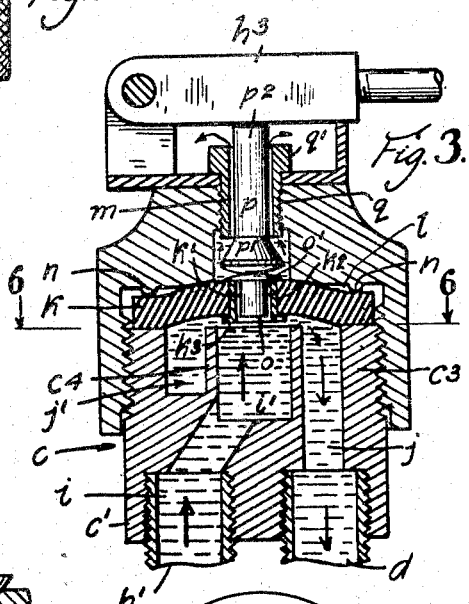
Fig. 3.
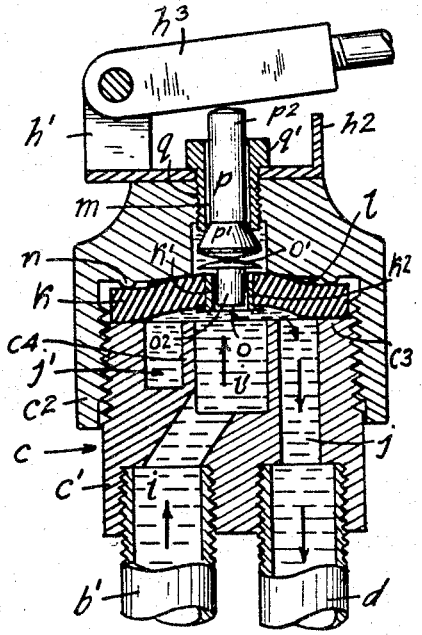
Fig. 4.
Fig. 6.
Inventor:
Elmer E. McCormack
by W. C. Kinney
Attorney.

Patented Jan. 10, 1939

2,143,204

UNITED STATES PATENT OFFICE 2,143,204

FLOAT-OPERATED VALVE MECHANISM

Elmer E. McCormack, Portland, Oreg.

Application November 23, 1935, Serial No. 51,189

1 Claim. (Cl. 137—139)

My invention relates to a float operated valve mechanism having specific utility as a flush valve or ball cock in a water closet. Its utility is not limited to such specific use however, and it has utility as well in any fluid control valve in which a constant head of water is provided in a reservoir by the use of a buoyant float which rides to the surface of said body of water and opens said valve when the level is lowered.

The principal object of my invention is to provide a float operated valve which opens quickly to fill the reservoir in a minimum time and which closes quickly but without "water hammer".

A further object of my invention is to provide a valve of this character which operates very quietly, one which has few moving parts, one in which the parts move relatively one with the other so as to prevent the formation of corrosive deposits which produce adhesion of the parts to each other and which prevent the valve from functioning in a proper manner.

A further object of my invention is to provide a valve of this character which is adapted to operate with equal facility with varying water pressures as well as with extremely permanent high and extremely low water pressures. Said valve is provided with a valve member which is balanced between equal water pressures and which would normally be closed because of greater area in contact with said water pressure tending to close said valve. Said valve differs from the ordinary float operated valve of this character with which I am familiar in that it is opened by the weight of the buoyant float and the buoyancy of said float permits the water pressure to close it.

Details of my invention and the mode of operation thereof are hereinafter set out in detail with reference to the accompanying drawing, in which:

Fig. 1 is a diagrammatic illustration of a water closet tank with the side walls shown broken away to disclose operating parts which would otherwise be concealed;

Fig. 2 is a fore-shortened external view of my improved valve with the water connections shown therefor;

Fig. 3 is a longitudinal sectional view shown on an enlarged scale thru the valve portion thereof with the parts shown as arranged when water is flowing thru said valve;

Fig. 4 is a view similar to Fig. 3 with the parts arranged just before the valve is closed;

Fig. 5 is a similar view to the two preceding views with the valve shown closed;

Fig. 6 is a plan view of the body portion of said valve as it lies below the disc-like valve or closure element, said view being taken on the line 6—6 of Fig. 3.

My invention is particularly adapted for use in a tank or water closet $a$ shown as having a removable cover $a'$. Said tank or water closet is shown as one of the type in which the water intake pipe $b$ enters from the floor $a2$ thereof. Said intake pipe serves not only as a conduit but as a standard for supporting the control valve with which my invention is particularly concerned. Above the floor $a2$ of said tank $a$ a slightly smaller intake pipe $b'$ stands upwardly and the valve head $c$ is carried thereby. A discharge pipe $d$ extends downwardly therefrom towards the said floor $a2$, the mouth of said discharge pipe opposing and being spaced from said floor a substantial distance.

The standard overflow pipe $e$ is provided and the water outlet $f$ is provided with a stopper (not shown) which is manually lifted by the actuation of the handle $g$ and the lever $g'$. A float $h$ is pivotally mounted upon a bracket $h'$ carried by the valve head $c$. A stop $h2$ limits the movement of said float downwardly.

All of the parts described heretofore are of standard construction and my invention is concerned only with the elements hereinafter described which are housed more or less within said valve head $c$. Said valve head comprises a body $c'$ and a cap $c2$ screw-threaded to the body. The valve body defines the intake conduit $i$ which communicates with the bore of the intake pipe $b'$ within the tank $a$ and angles over to a centrally disposed well $i'$ which extends axially of said body. The discharge conduit $j$, terminates at its upper end in an annular well $j'$ and communicates at its lower end with the bore of the discharge pipe $d$.

The upper surface of the body is flat and disposed substantially across the entire area thereof is a flat valve member $k$. Said valve member is made of a disc of elastic material such, for example, as reinforced rubber and said member $k$ acts more or less as a diaphragm. It is apertured at its center, however, said aperture forming an auxiliary duct or passageway $k'$ leading from the well $i'$ to a pressure chamber $l$ lying above said valve member $k$. The face of the cap $c2$ is concaved as is shown in Figs. 3, 4 and 5 and the relieved portion constitutes the pressure chamber. Said head also is provided with a central recessed portion $m$ extending above the general curvature of said recessed portion.

Overlying the rim of the valve member is an annular projection $n$ which overlies the rim $c3$ of the body portion lying exteriorly of the annular well $j'$. The cap $c2$ and the body portion $c'$ being screw-threaded together thus permits them to be set down towards each other until the annular projection $n$ holds the rim of the disc-like valve member tightly against the rim portion $c3$ of the body. The central portion of said valve member is not similarly compressed and thus it is permitted to flex upwardly and downwardly limited only by its factors of elongation and elasticity and the contour of the under surface of the cap $c2$. The latter is formed so as to limit the upward movement of said valve member $k$ to the degree shown in Fig. 3.

This permits water to flow upwardly from the well $i'$ over the intervening cup-shaped partition $c4$ and into the annular well $j'$. The water in moving upwardly from said well $i'$ and into the annular well $j'$ is thus formed into a flat thin lateral spray. This provides a water cushion under the diaphragm which flexes it upwardly and resists the elasticity of the disc in causing the latter to reseat itself. This is important for the reason that it prevents said disc-like valve member $k$ from suddenly being reseated which would produce so-called "water hammer" due to the sudden stoppage of flow of water in the conduits and in the valve.

A central collar $k2$ surrounds the auxiliary duct $k'$ and said collar is preferably made of some noncorrodable metal such as Monel metal. Lying in said collar is a metering pin $o$ provided with a head $o'$. Said head is of larger diameter than the duct $k'$ and thus said metering pin is prevented from falling out of said duct because of the engagement of said head with the upper surface of the valve member $k$ and with the upper edge of the collar $k2$. The collar $k2$ is also provided with an external laterally extending flange $k3$ which underlies the valve member $k$. Said flange $k3$ prevents the collar from being forced upwardly by the pressure of the water which distorts the valve member in the manner indicated in Figs. 3 and 4.

A valve $p$ having a conical head $p'$ overlies the metering pin $o$ and extends upwardly thru the bore of a bushing $q$. Said bushing is seated in the upper part of the cap $c2$ and the stem $p2$ of the valve extends thru the bore of the bushing. The stem of said valve when the head is seated upon the inner end of the bushing extends externally beyond the bushing to the distance shown in Figs. 4 and 5. The end of said valve stem extends above the plane of the top of the stop member $h2$ and is adapted to bear against the under surface of the float arm $h3$. When said float arm is in non-buoyant position as when the water in the reservoir lies below its desired level, said arm bears against and rests upon the stop $h2$. It pushes the valve $p$ downwardly to the position shown in Fig. 3. When said float moves upwardly with the level of the rising body of water it gradually permits the water pressure in the valve body to move the valve $p$ upwardly until it seats. Said valve member $p$ and the bushing $q$ are also preferably made of Monel metal so that said parts will not readily corrode.

The clearance between the bore of the bushing $q$ and the stem portion $p2$ of the valve $p$ is exaggerated as is the clearance between the stem $o2$ of the metering pin $o$ and the bore of the collar $k2$. Actually there is only a very slight clearance, hardly more than a working clearance or a few thousandths of an inch play between the stem of the metering pin $o$ and the bore of the collar $k2$. A slightly greater clearance is provided between the stem $p2$ of the valve $p$ and the bushing $q$. This arrangement is made so that water moving past the metering pin $o$ has a greater opportunity to escape to the exterior of the valve cap than to build up a pressure within the pressure chamber $l$, when the valve $p$ is unseated. This permits the valve member $k$ to be flexed as is shown in Figs. 3 and 4 and to remain flexed because substantially all of the water pressure is beneath the valve member $k$.

When the valve member $p$ is seated the slight clearance between the stem $o2$ of the metering pin and the bore of the collar corresponding limits the flow of water into the pressure chamber and causes the valve member $k$ to become seated quite slowly. The formation of the lateral spray beneath said valve member $k$ and over the cup-like partition $c4$ also limits the downward movement of said valve member to the position shown in Fig. 5.

The head $q'$ of the bushing $q$ overlies the bracket $h'$ and said bushing provides a pivotal connection for said bracket $h'$ with the valve head $c$. As is shown in Fig. 2 the exterior of the cap $c2$ is knurled or otherwise roughened so it can readily be gripped and screwed into place.

A valve embodying my invention operates as follows:

When the tank or water closet $a$ defining the reservoir of water to be maintained at constant level is filled with water at its proper height the parts are arranged as shown in detail in Fig. 5 and as shown externally in Fig. 1. When the stopper is pulled up from the water outlet and the water is permitted to flow out of said tank the float moves downwardly until its rod comes into contact with the stop $h2$. This depresses the valve $p$ and permits the water accumulated above the valve member $k$ to be expressed outwardly by the water pressure in the intake well $i'$ acting against the underside of the valve member. It moves the latter up against the underside of the cap $c2$, as is diagrammatically illustrated in Fig. 3, and permits water to flow over the top of the cup-shaped partition of $c4$ and down the discharge pipe $d$. This continues until the water again reaches the level where the float is lifted upwardly from the stop $h2$ and it is at this point that the valve $p$ is seated closing the outlet above the valve member $k$ and permitting water to accumulate therein until the valve member is forced down across the port defined by the mouths of the wells $i'$ and $j'$, as is indicated in Fig. 5.

The diaphragm is moved downwardly by said water pressure because there is a greater exposed area of the diaphragm facing the pressure chamber $l$ than there is in the well $i'$. It is to be understood that there is a negligible amount of pressure exerted against the underface of the diaphragm by the water in the annular well $j'$.

Speed of filling the tank or water closet $a$ is one prime requisite of a valve of this character and quiet operation is another. The tank is filled at maximum speed with my valve because as soon as the float moves downwardly until it depresses the valve $p$ the diaphragm is of sufficient flexibility and the aperture provided above the partition $c4$ is of sufficient area that a full stream of water is permitted to discharge from the pipe $d$. Stoppage of flow is as fast as is desirable when taking quietness of operation into consideration. Quietness in filling is accomplished by producing the lateral flat spray over the top of the cup-shaped partition c4 while quietness of shut-off is produced by the small clearance between the metering pin and the bore of the collar k2. The slight amount of clearance between said metering pin and the bore of said collar is effective because of its small cross-sectional area as compared to the cross-sectional area or capacity of the pressure chamber l, as well as the cross-sectional area of said passageway with that surrounding the valve p.

The relation between the first clearance and the area or capacity of the pressure chamber is important in producing relatively slow acting and quiet shut-off while the latter relation is important in producing quick commencement of flow at the beginning of the filling action of said valve.

One important operating feature is that when the valve p ascends the metering pin o descends in its aperture. The slight amount of movement of said parts however does not produce excessive wear but only dislodges grit and any tendency for corrosive deposits to occur. The major movement within the valve is made by the diaphragm. Said movement is purely a flexing action rather than a longitudinal sliding movement and thus wear is reduced to a minimum.

I claim:

In a valve mechanism for fluids, a body defining a valve chamber, an intake conduit and a discharge conduit communicating with each other thru said valve chamber, a valve element housed in said chamber adapted in one position to interrupt communication between said conduits, said valve element comprising an elastic disc adapted to be distended by the fluid pressure in the intake passageway, thereby to permit communication between said conduits, said valve element provided with a central aperture connecting the intake conduit and the valve chamber, a by-pass leading from said valve chamber to the exterior of the valve body, an auxiliary valve adapted in one position to close said by-pass, means operable to one position to hold said auxiliary valve open with respect to said by-pass, and in another position to permit it to seat and thus to close the latter, a separate flow-restricting element arranged in the central aperture of the valve element, said flow restricting element comprising a member provided with a head overlying said aperture and a stem loosely extending into the latter, said auxiliary valve operating to hold said flow restricting element in aperture closing position when it is held in open by-pass position.

ELMER E. McCORMACK.